United States Patent [19]

Tashlick et al.

[11] Patent Number: 4,588,523
[45] Date of Patent: May 13, 1986

[54] INTUMESCENT FIRE RETARDANT COMPOSITIONS

[75] Inventors: Irving Tashlick, Long Branch; Philip F. Valenziano, Old Bridge, both of N.J.

[73] Assignee: Alva-Tech, Inc., Asbury Park, N.J.

[21] Appl. No.: 614,750

[22] Filed: May 29, 1984

[51] Int. Cl.⁴ .................. C09K 21/00; A62D 5/00; A62C 3/16
[52] U.S. Cl. .................. 252/606; 106/18.12; 106/18.16; 106/18.17; 106/18.29; 106/18.31; 106/18.32; 169/45; 252/609; 428/921
[58] Field of Search .......... 252/606, 609, 610, 601; 428/920, 921; 106/15.05, 18.11, 18.12, 18.14, 18.15, 18.16, 18.17, 18.29, 18.31, 18.32, 18.33, 74; 169/45

[56] References Cited

U.S. PATENT DOCUMENTS

| | | | |
|---|---|---|---|
| 3,455,850 | 7/1969 | Saunders et al. | 252/606 |
| 4,065,394 | 12/1977 | Pratt et al. | 252/606 |
| 4,118,325 | 10/1978 | Becker et al. | 252/606 |
| 4,216,261 | 8/1980 | Dias | 252/606 |
| 4,265,963 | 5/1981 | Matalon | 252/606 |
| 4,357,460 | 11/1982 | Blount | 528/271 |

FOREIGN PATENT DOCUMENTS

| | | | |
|---|---|---|---|
| 0051347 | 5/1982 | European Pat. Off. | 252/606 |
| 2938874 | 4/1981 | Fed. Rep. of Germany | 252/606 |
| 2406659 | 6/1979 | France | 252/606 |
| 0133223 | 11/1978 | Japan | 252/606 |
| 0133222 | 11/1978 | Japan | 252/606 |
| 0100963 | 6/1982 | Japan | 252/606 |
| 2104534 | 3/1983 | United Kingdom | 252/606 |

OTHER PUBLICATIONS

Product Literature on "Phoschek".

*Primary Examiner*—Stephen J. Lechert, Jr.
*Assistant Examiner*—Howard J. Locker
*Attorney, Agent, or Firm*—Curtis, Morris & Safford

[57] ABSTRACT

A heat expanding, fire retardant composition comprising an intumescent component, an organic char-forming component, fillers, plasticizers, fire retardants, and a binder wherein the binder is a polyurethane which is formed in situ.

16 Claims, No Drawings

INTUMESCENT FIRE RETARDANT COMPOSITIONS

The present invention relates to intumescent fire retardant compositions and processes for the manufacture thereof. It particularly relates to compositions which can be manufactured by simple molding procedures.

BACKGROUND OF THE INVENTION

The need for better materials to effectively fill voids left by burning or melting cable insulation in the case of a fire in modern buildings or in power stations has long been recognized. Better thermal insulating coverings for walls, doors, ceilings, etc. are also needed. Such materials have the property of remaining in an unexpanded flexible form until heat, such as that produced by a fire, is applied, at which time they will expand to become substantially rigid refractory thermal insulators.

The materials and processes heretofore employed, as described below, have certain disadvantages. They usually provided protection for only limited periods of time because of poor stability at elevated temperatures or damage by high-pressure water sprays due to low mechanical strength. They have had the further disadvantage that they were not water-proof and had low volume expansions and pressure generation, particularly at low temperatures, with a resultant loss in their capacity to fill void areas or provide thermal insulation, thus allowing the spread of smoke or fire.

U.S. Pat. No. 3,786,604 is illustrative of the prior art and discloses the concept of filling the gap between a concrete floor slab and an upright curtain wall with a urea formaldehyde resin foam which is supported in a though made of thin resilient sheet steel. The steel though support is required because of mechanical strength of the foam is relatively low and that of the charred foam is even lower.

U.S. Pat. No. 3,429,836 discloses a process for producing thermal insulating coverings from organic (poly-styrene and copolymers of styrene) foam materials in combination with alkali metal silicates. The composition is made into rigid boards for use as thermal insulating covers on surfaces such as walls, ceilings, doors, and the like. The formed board-like material must be coated with a protective layer of lacquers or plastic films to render it moisture resistant.

U.S. Pat. No. 3,983,082 relates to a silicone resin base fire retardant system having a temperature capability to at least about 230° C. and combines intumescent characteristics with a crusting and charring capability. These materials are intended primarily for use in aircraft gas turbine engines and they are most effective at relatively high temperatures on the order of 1000° C. or higher.

U.S. Pat. No. 4,273,879 relates to a product which contains only solid materials, its matrix being principally vulcanized rubber. The product can only be manufactured by the use of dry rubber techniques and the flexible rubber like material thus prepared then has to be shaped and die cut to form products of desired sizes and shapes. Thus additional steps in the manufacturing are required.

It is accordingly an object of this invention to provide a one-step process for the manufacture of intumescent fire retardant materials of desired sizes and shapes.

It is another object of this invention to provide a composition for use in this process.

Other objects will appear from the description which follows.

DESCRIPTION OF THE INVENTION

In accordance with this invention there are provided heat-expanding fire retardant compositions which can vary from a substantially rigid form, such as, for example, sheeting, to a flexible form that can have a soft putty-like consistency to a hard consistency such as that of a hard rubber. Unlike the products of the prior art, the products of this invention can, when desired, be formed into any desired shape by molding, regardless of the complexity of the shape.

Useful materials in the compositions of this invention include, in percent by weight, about 15 to about 40% of a binder, about 15 to about 80% of one or more intumescent compounds, up to about 40% of one or more organic char-forming components, and up to about 50% of fillers such as granular inorganic materials, organic or inorganic fibers, fire retardants, plasticizers, and reinforcing agents. If desired, an anti-oxidant may be added.

The preferred binder is a polyurethane which is formed in situ as described below.

Intumescent components ("blowing agents") Geon 221, a polyvinylchloride, available from B. F. Goodrich, and hydrated alkali metal silicates. An especially preferred alkali metal silicate is granular sodium silicate having a particle size from about 0.2 mm to about to about 0.2 mm, with 95% of the particles being greater than 0.2 mm, a moisture content of about 5 to about 10%, and a $SiO_2:Na_2O$ ratio from about 2 to 3.75:1. Preferably, the $SiO_2:Na_2O$ ratio should be closer to 2. The particle size can be varied to suit the intended use. Suitable silicates meeting these requirements are G-silicate and HS-240, hydrated sodium silicates available from the PQ Corp.

Char-forming materials include polyvinyl-chloride, tricyanurotriamide (Melamine), available from Melamine Chemicals, Inc., chlorinated polyvinylchloride, chlorinated polyethylene, chlorinated polypropylene, chlorinated paraffins, polyvinylidene chloride, polyvinyl bromide, and the like.

Fillers found to be suitable in the practice of this invention include zinc oxide, which also serves as a reinforcing agent, glass fibers, and glass particles such as Potter Glass, glass spheres available from Potters Ind.

Fire retardants include Phoschek (ammonium polyphosphate), Melamine (described above), liquid chlorinated paraffins such as Paroil 152 available from Dover Chemical, and Chlorowax 70, a solid chlorinated paraffin available from Diamond Shamrock.

Liquid chlorinated paraffins such as Paroil 152 (described above) and Ennis S-52 available from Ennis Chemical Co. have been found suitable for use as plasticizers.

Hindered phenols such as Cyanox 2246 (available from American Cyanamid) are a preferred anti-oxidant.

The consistency and hardness of the compositions were achieved by varying the amounts of the individual components of the compositions. The use of plasticizers such as liquid chlorinated paraffins will give softer materials, while increasing the amount of fillers, such as zinc oxide or glass particles, will give harder materials. In accordance with this invention the hardness of the product is controlled by varying the isocyanate:hydroxyl ratio. At an isocyanate:hydroxyl ratio of 0.6, putty-like materials were obtained; at a 0.7–0.9 ratio, rubbery materials were obtained, and at a 0.9 to 1.2 ratio harder, friable materials are obtained. The hardness can be somewhat modified by the plasticizer and filler, but the effect of varying the isocyanate:hydroxyl ratio is more powerful.

The polyurethane, as noted above, was prepared in situ by the reaction of a liquid polyol with a diisocyanate or polyisocyanate. Any isocyanate containing two or more isocyanate groups per molecule is suitable. Preferred polyols include Poly bd-45 Mg and Poly bd-45 HT, liquid hydroxyl-terminated-(poly-butadienes), available from Arco Chemical. A preferred diisocyanate is Isonate 191 available from the Upjohn Co. This compound is a liquid diphenylmethylene-diisocyanate, di-(p-phenyl)-methylene-diisocyanate. In preparing the intumescent fire retardant compositions, desired amounts of the various intumescent compounds, fire retardants, plasticizers, char-formers, anti-oxidants, fillers, reinforcing agents, etc. were mixed at room temperature with the polyol until a substantially uniform mixture was obtained. The mixing was continued while the diisocyanate was added and continued until a substantially uniform mixture was obtained. The mixture was then poured into molds of desired sizes and shapes or spread out as sheets to harden.

By preparing the products in this manner the polyol is used as a liquid medium in which the various components are mixed. This avoids the use of other liquids such as water which is undesirable to use or organic solvents which may create fire hazards, problems of inhalation, or subsequent shrinkage. Evaporation of solvents will also cause shrinkage and warping which are undesirable.

The invention will become clearer from the examples which follow. These examples are only given by way of illustration and are not to be considered as limiting. The amounts of the materials in the examples are given in parts by weight, and expansion tests were carried out at 175° C. and 350° C. The values for the expansion are given as "x fold".

EXAMPLE 1

152 parts of HS-240, 22.4 parts of Paroil 152, 76 parts of zinc oxide and 30 parts of Geon 221 were mixed with stirring in 112.8 parts of Poly bd R-45 M and stirred until a substantially uniform mixture was obtained. 10.4 parts of Isonate 191 were then added to this mixture and stirring continued until a substantially uniform mixture was obtained. The mixture was poured into a mold and allowed to set. The product was a soft rubber with high elongation. It showed a 2-fold expansion when heated at 175° C. for about 45 minutes and 5.8 fold when heated at 350° C. for about 50 minutes.

EXAMPLES 2 TO 17

The procedure of Example 1 was used when preparing the compositions of Examples 2 to 17. The compositions were tested for heat expansion as described above.

The compositions of these examples, expanded at least about 2-fold when heated at 175° C. and at least about 4.5 fold when heated at about 350° C., and left a refractory residue when heated to temperatures as high as 800° C. They hardened into rigid insulating materials. At ambient temperatures the products of these examples retained their forms, indefinitely, whether sheet or molded. The degrees of hardness of the products of these examples are also shown.

| MATERIALS/EXAMPLES | EXAMPLES 2–17 | | | | | | | |
|---|---|---|---|---|---|---|---|---|
| | 2 | 3 | 4 | 5 | 6 | 7 | 8 | 9 |
| POLY bd-R 45 M | 112.8 | 112.8 | 112.8 | 135 | | 112.8 | 112.8 | 112.8 | 112.8 |
| POLY bd-R 45 HT | | | | | 112.8 | | | |
| PAROIL 152 | 22.4 | | | 22.4 | | | | 40 |
| ZINC OXIDE | 76 | 36 | 30 | 30 | 30 | 30 | 30 | 70 |
| GEON 221 | 44 | 30 | 30 | 30 | 30 | | 60 | 30 |
| CYANOX 2246 | | | | | | | | |
| CHLORINATED POLYVINYL CHLORIDE | 5 | 5 | | | | 5 | | |
| PHOSCHEK | | | 30 | 25 | 25 | 25 | 25 | 25 |
| CHLORINATED PARAFFINS | | | 10 | 5 | | | | |
| MELAMINE | | | | | 25 | 25 | 25 | 25 |
| ENNIS S-52 | | 22.4 | 22.4 | | 22.4 | | 22.4 | |
| CHLOROWAX 70 | | | | | | 60 | | |
| POTTER GLASS SILICATE | | 26 | 30 | 25 | | | | |
| HS-240 | 152 | 152 | 152 | 152 | 152 | 152 | 152 | 152 |
| ISONATE 191 | 10.4 | 10.0 | 9.0 | 10.0 | 11.0 | 9.5 | 9.5 | 9.5 |
| EXPANSION 20 X-FOLD 350° C. | 6.2 | 7.8 | 9.8 | 8.3 | 5.8 | 6.9 | 6.8 | 6.9 |
| EXPANSION 20 X-FOLD 175° C. | 1.9 | 3.5 | 4.3 | 3.7 | 3.2 | 3.4 | 4.0 | 3.3 |
| CHLORINATED POLYETHYLENE | | | | | | | | |
| HARDNESS | FIRM | SOFT | V. SOFT | SOFT | SOFT | FIRM | SOFT | SOFT |

| MATERIALS/EXAMPLES | EXAMPLES 2–17 | | | | | | | |
|---|---|---|---|---|---|---|---|---|
| | 10 | 11 | 12 | 13 | 14 | 15 | 16 | 17 |
| POLY bd-R 45 M | 112.8 | 112.8 | | | | | 112.8 | 112.8 |
| POLY bd-R 45 HT | | | 112.8 | 112.8 | 112.8 | 112.8 | | |
| PAROIL 152 | 40 | 40 | 40 | 40. | 40 | 40 | | |
| ZINC OXIDE | 60 | 30 | 35 | 35 | 35 | 35 | 36 | 36 |
| GEON 221 | 30 | 30 | 30 | 30 | 30 | 30 | 30 | |
| CYANOX 2246 | | | 2.5 | | 2.5 | 2.5 | | |
| CHLORINATED POLYVINYL CHLORIDE | | | | | | | | |
| PHOSCHEK | 25 | 25 | 25 | 25 | 25 | 25 | | 25 |
| CHLORINATED PARAFFINS | | 5 | | | 5 | | | |
| MELAMINE | | 25 | 25 | | 25 | 25 | | 25 |

-continued

| | | | | | | | | |
|---|---|---|---|---|---|---|---|---|
| ENNIS S-52 | | | | | | | 22.4 | |
| CHLOROWAX 70 | | | | | | | | 20 |
| POTTER GLASS | | | | | | | 36 | 36 |
| SILICATE | | | | | 50 | | | |
| HS-240 | 152 | 152 | 152 | 152 | 180 | 102 | 152 | 152 |
| ISONATE 191 | 9.5 | 9.5 | 9.5 | 9.5 | 9.5 | 9.5 | 9.0 | 11.0 |
| EXPANSION 20 X-FOLD 350° C. | 6.9 | 4.5 | 8.4 | 7.0 | 10.3 | 6.8 | 9.7 | 7.2 |
| EXPANSION 20 X-FOLD 175° C. | 3.7 | 3.1 | 4.1 | 4.2 | 5.1 | 3.6 | 8.7 | 3.6 |
| CHLORINATED POLYETHYLENE | 10 | | | 5 | | | | |
| HARDNESS | SOFT | V. SOFT | V. SOFT | SOFT | SOFT | V. SOFT | V. SOFT | HARD |

We claim:

1. A solid, heat expandable, fire retardant composition capable of expanding to more than 2 times its original volume when heated to about 175° C. and to at least 4.5 its original volume when heated to about 350° C., and having increased insulating and sealing efficiency at said elevated temperatures, said composition consisting essentially of about 15 to about 40 percent by weight of an unfoamed polyurethane resin binder, about 15 to 80 percent by weight of an intumescent granular hydrated alkali metal silicate, up to about 40 percent by weight of one or more char-forming components, and up to about 50 percent by weight of fillers, fire retardants, plasticizers, and reinforcing agents, said unfoamed polyurethane resin being formed by the reaction of an hydroxy-terminated poly(butadiene) and an isocyanate having at least two isocyanate groups per molecule.

2. A composition according to claim 1 wherein said isocyanate is diphenylmethylene diisocyanate.

3. A composition according to claim 1 wherein the intumescent granular hydrated alkali metal silicate is a hydrated sodium silicate containing at least 10% by weight of water and having a $SiO_2:Na_2O$ ratio from about 2 to 3.75:1.

4. A composition according to claim 3 wherein the $SiO_2:Na_2O$ ratio is about 2.

5. A composition according to claim 1 wherein the char-forming component is polyvinylchloride.

6. A composition according to claim 1 wherein the filler is zinc oxide.

7. A composition according to claim 1 wherein the fire retardant is chlorinated paraffin.

8. A composition according to claim 1 wherein the plasticizer is a liquid chlorinated paraffin.

9. A composition according to claim 1 wherein the fire retardant is ammonium polyphosphate.

10. A composition according to claim 1 wherein the filler is glass particles.

11. A composition according to claim 1 wherein melamine is present as a char-forming component and a fire retardant.

12. A composition according to claim 1 which contains in parts by weight:
a polyurethane formed from
112.8 parts of hydroxyl terminated poly(butadiene), and
10.4 parts of p-(diphenylmethylene)-diisocyanate,
22.4 parts of a liquid chlorinated paraffin,
76.0 parts of zinc oxide,
30.0 parts of polyvinlchloride, and
152 parts of hydrated sodium silicate.

13. A composition according to claim 1 which contains in parts by weight:
a polyurethane formed from
112.8 parts of hydroxyl terminated poly(butadiene), and
9.0 parts of p-(diphenylmethylene)-diisocyanate
30 parts of glass spheres,
30 parts of ammonium polyphosphate,
22.4 parts of a liquid chlorinated paraffin,
30 parts of polyvinylchloride,
30 parts of zinc oxide, and
152 parts of hydrated sodium silicate.

14. A composition according to claim 11 which contains a hindered phenol antioxidant.

15. A composition according to claim 1 which contains in parts by weight:
a polyurethane formed from
112.8 parts of hydroxyl terminated poly(butadiene),
9.5 parts of p-(diphenylmethylene)-diisocyanate,
40 parts of a liquid chlorinated paraffin,
35 parts of zinc oxide,
30 parts of polyvinylchloride,
25 parts of ammonium polyphosphate,
25 parts of melamine,
2.5 parts of hindered phenol, and
180 parts of hydrated sodium silicate.

16. A composition according to claim 1 wherein the polyurethane is formed in situ.

* * * * *